United States Patent
Frederiksen

(10) Patent No.: US 9,221,219 B2
(45) Date of Patent: Dec. 29, 2015

(54) METHOD OF PRODUCING A COMPOSITE STRUCTURE VIA INTERMEDIATE PRODUCTS, THE RELATED APPARATUS AND A COMPOSITE STRUCTURE OBTAINABLE BY THE METHOD

(75) Inventor: Henrik Frederiksen, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 685 days.

(21) Appl. No.: 12/733,449

(22) PCT Filed: Aug. 22, 2008

(86) PCT No.: PCT/DK2008/000297
§ 371 (c)(1),
(2), (4) Date: Mar. 2, 2010

(87) PCT Pub. No.: WO2009/030228
PCT Pub. Date: Mar. 12, 2009

(65) Prior Publication Data
US 2010/0304170 A1    Dec. 2, 2010

(30) Foreign Application Priority Data
Sep. 4, 2007   (EP) .................................... 07388067

(51) Int. Cl.
*B29C 70/44*   (2006.01)
*B29C 65/40*   (2006.01)
(Continued)

(52) U.S. Cl.
CPC .............. *B29C 70/443* (2013.01); *B29C 65/40* (2013.01); *B29C 65/42* (2013.01); *B29C 65/70* (2013.01);
(Continued)

(58) Field of Classification Search
USPC ......... 264/45.3, 640–642, 168, 241, 242, 258
See application file for complete search history.

(56) References Cited

U.S. PATENT DOCUMENTS

| 4,015,035 A | 3/1977 | Blad et al. |
| 6,264,877 B1 * | 7/2001 | Pallu De La Barriere .... 264/516 |

(Continued)

FOREIGN PATENT DOCUMENTS

| DE | 103 52 964 B3 | 10/2004 |
| EP | 0 582 160 A1 | 2/1994 |

(Continued)

*Primary Examiner* — Stella Yi
(74) *Attorney, Agent, or Firm* — Nath Goldberg & Meyer; Jerald L. Meyer; Tanya E. Harkins

(57) ABSTRACT

A method of producing a composite structure comprising fiber reinforced material and having a longitudinal direction is described. The method comprises the following steps: a) manufacturing a first structure comprising a first cured composite part having a first thickness and a longitudinal direction with a first end, and a number of first fiber layers extending from the first end, b) manufacturing a second structure comprising a second cured composite part having a second thickness and a longitudinal direction with a second end, and a number of second fiber layers extending from the second end, and c) arranging the first structure and the second structure so that the first end faces towards the second end, and arranging the first fiber layers and the second fiber layers so that at least a part of the first fiber layers overlap at least a part of the second fiber layers in the longitudinal direction, d) supplying liquid resin in order to impregnate the first fiber layers and the second fiber layers, and e) curing the liquid resin in order to form the composite structure comprising the first cured composite part, the second cured composite part, and an intermediate composite part including the first fiber layers and the second fiber layers.

14 Claims, 4 Drawing Sheets

(51) Int. Cl.
  *B29C 65/42* (2006.01)
  *B29C 65/70* (2006.01)
  *B29C 65/00* (2006.01)
  *B29C 69/00* (2006.01)
  *B29C 35/02* (2006.01)
  *B29K 31/00* (2006.01)
  *B29K 63/00* (2006.01)
  *B29K 67/00* (2006.01)
  *B29K 101/10* (2006.01)
  *B29K 101/12* (2006.01)
  *B29K 105/06* (2006.01)
  *B29K 105/24* (2006.01)
  *B29K 307/00* (2006.01)
  *B29K 309/08* (2006.01)
  *B29L 31/08* (2006.01)

(52) U.S. Cl.
  CPC ............ *B29C 66/1142* (2013.01); *B29C 66/54* (2013.01); *B29C 66/721* (2013.01); *B29C 66/72141* (2013.01); *B29C 66/81455* (2013.01); *B29C 69/004* (2013.01); *B29C 35/02* (2013.01); *B29C 66/14* (2013.01); *B29C 66/71* (2013.01); *B29C 66/7212* (2013.01); *B29C 2791/001* (2013.01); *B29C 2791/006* (2013.01); *B29K 2031/00* (2013.01); *B29K 2063/00* (2013.01); *B29K 2067/00* (2013.01); *B29K 2101/10* (2013.01); *B29K 2101/12* (2013.01); *B29K 2105/06* (2013.01); *B29K 2105/24* (2013.01); *B29K 2307/00* (2013.01); *B29K 2309/08* (2013.01); *B29L 2031/082* (2013.01); *B29L 2031/085* (2013.01)

(56) References Cited

U.S. PATENT DOCUMENTS

| 6,749,155 B2 * | 6/2004 | Bergmann | .................... 244/133 |
| 2006/0083907 A1 | 4/2006 | Bech et al. | |
| 2008/0159871 A1 * | 7/2008 | Bech | ......................... 416/229 R |

FOREIGN PATENT DOCUMENTS

| GB | 2 162 791 A | 2/1986 |
| JP | 59-174315 A | 10/1984 |
| JP | 2000-102982 A | 4/2000 |
| WO | WO 2006/002621 A1 | 1/2006 |
| WO | WO 2006/103307 A2 | 10/2006 |

* cited by examiner

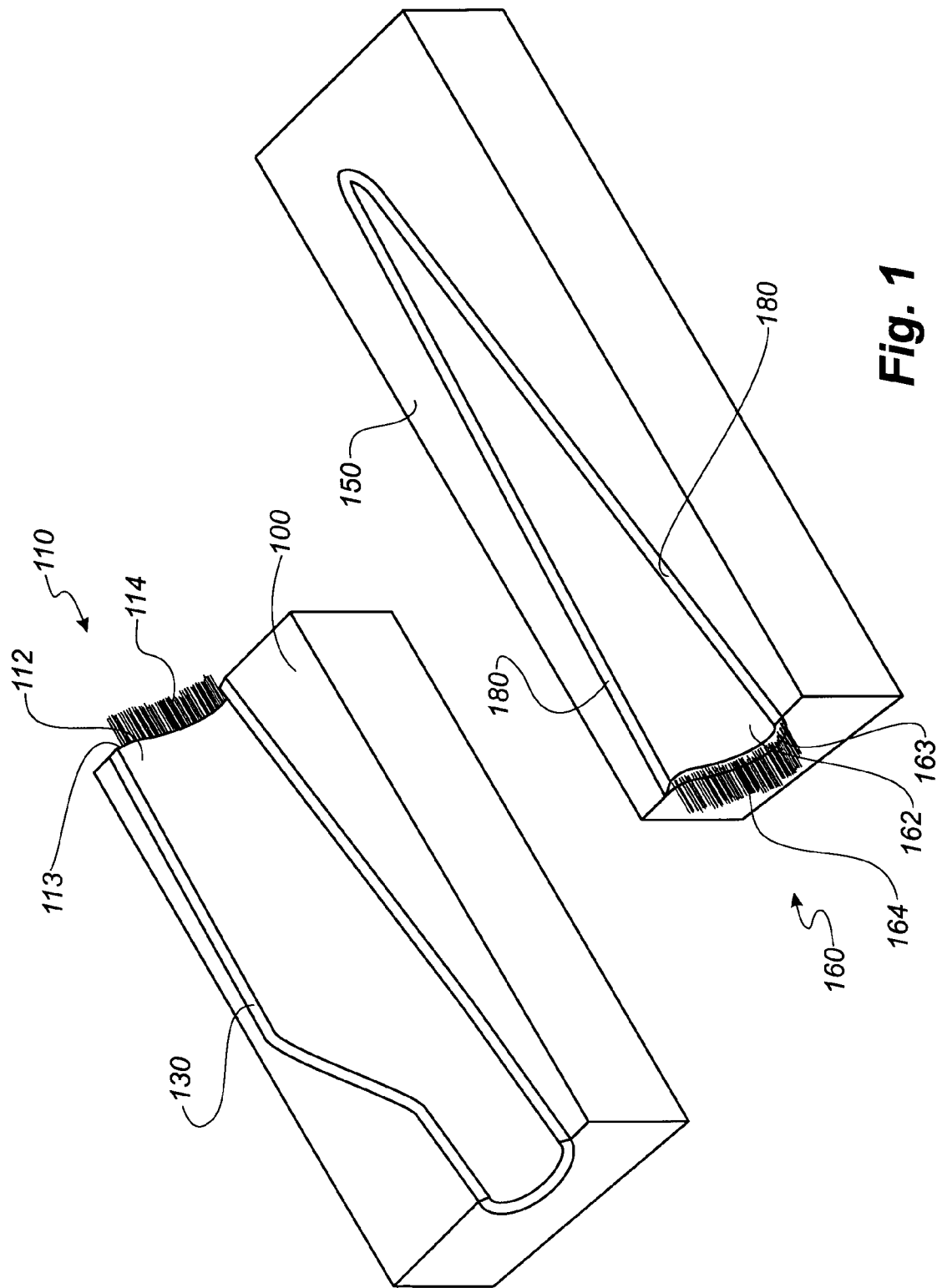

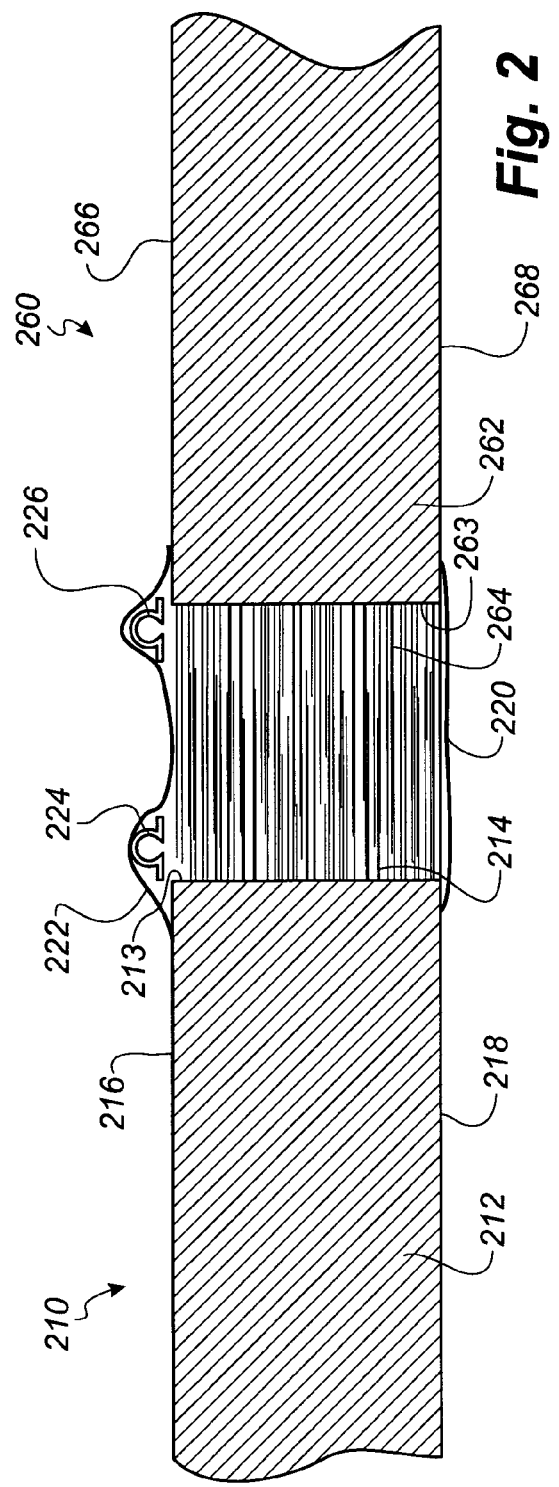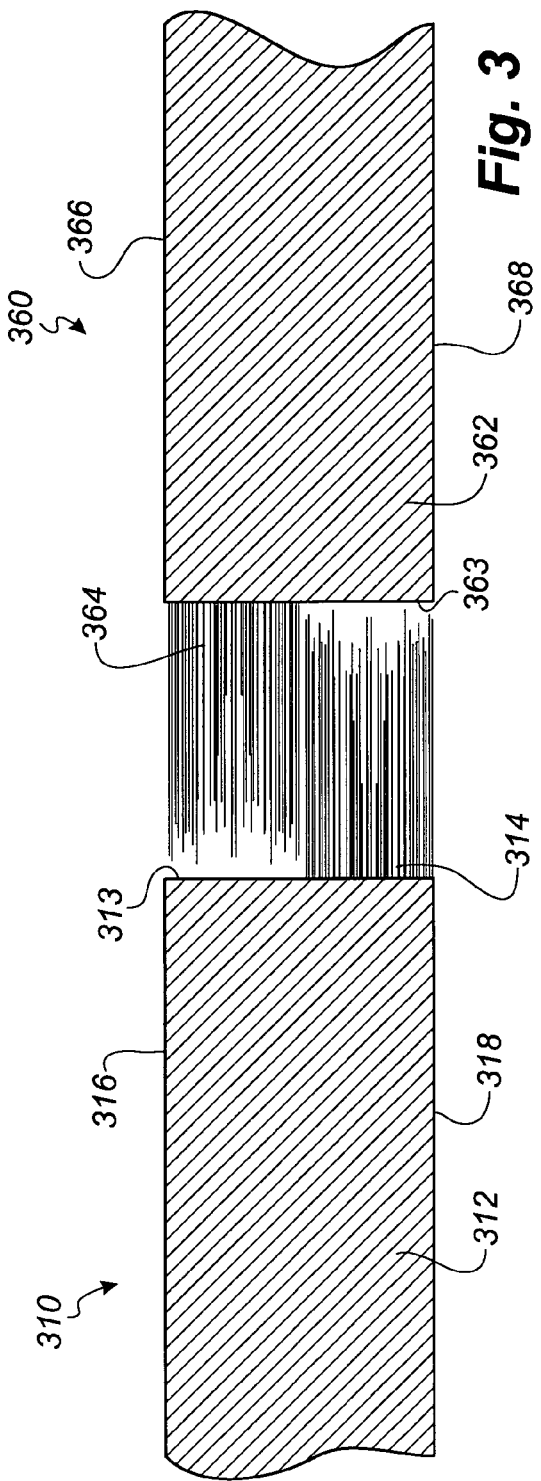

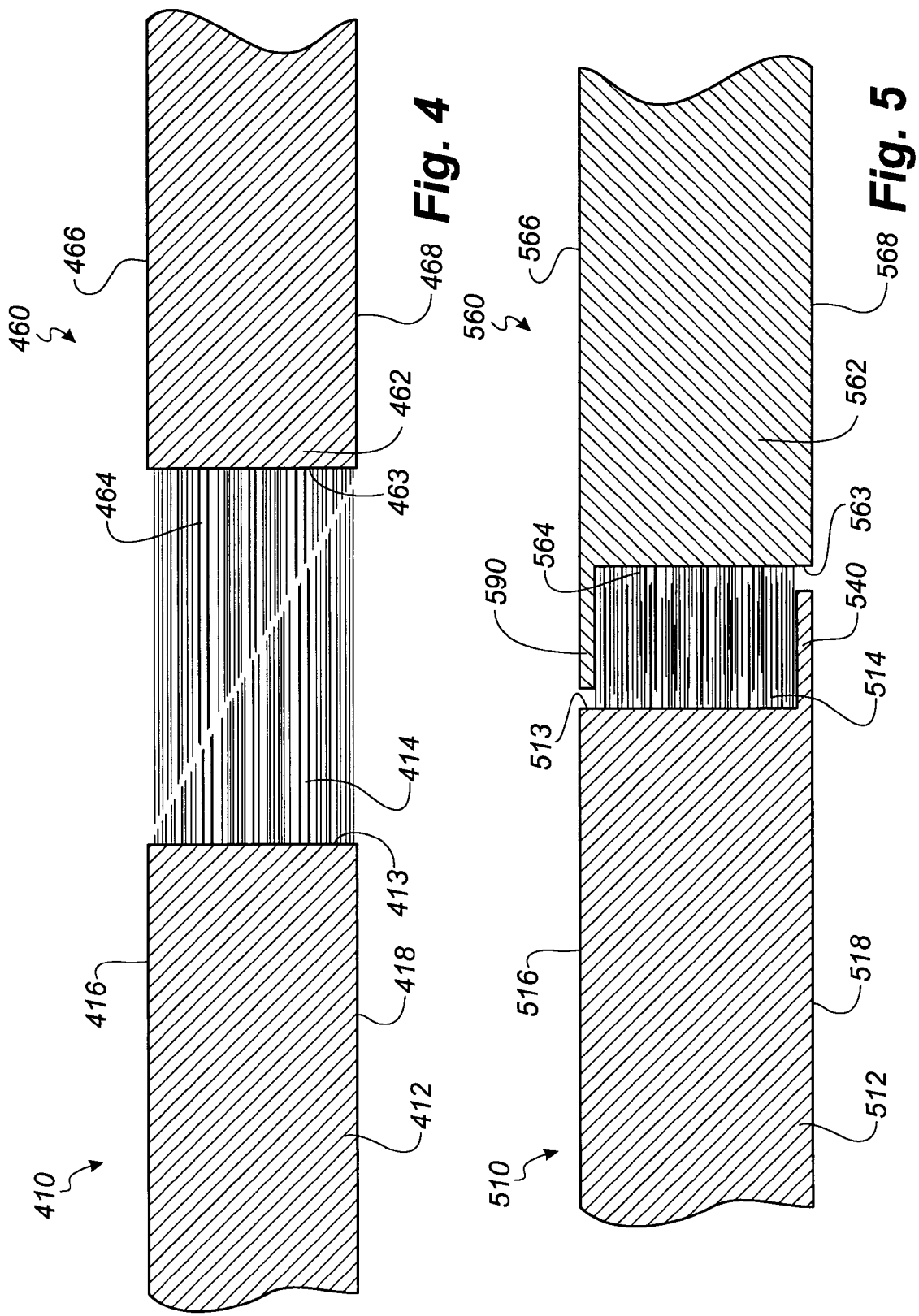

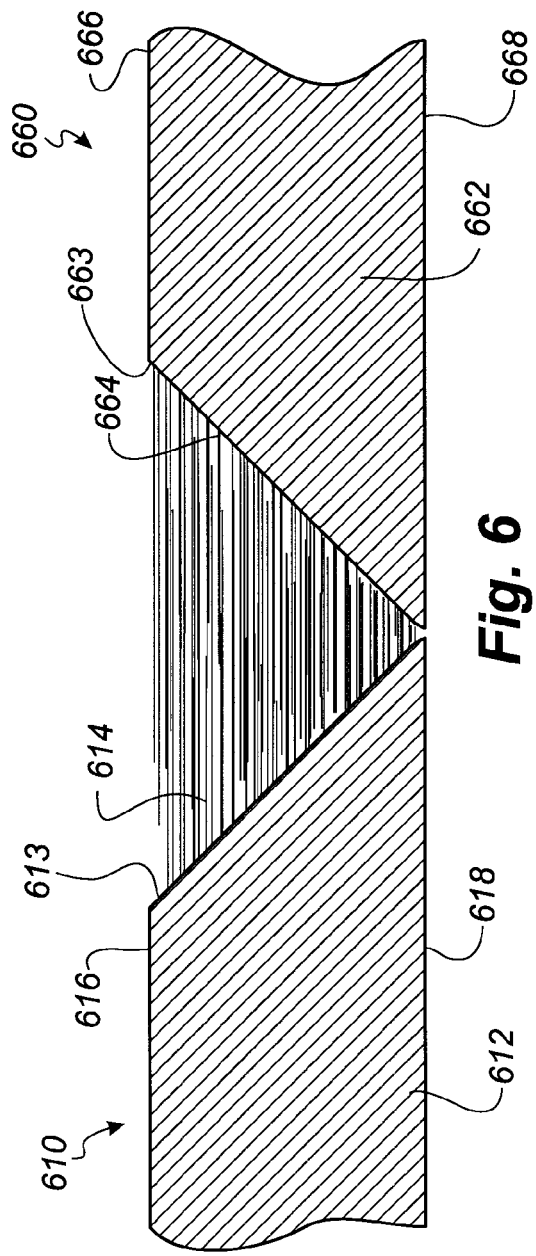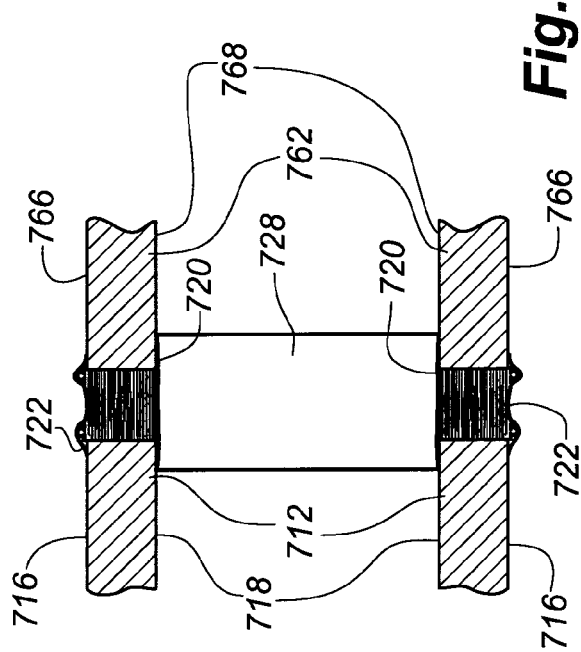

METHOD OF PRODUCING A COMPOSITE STRUCTURE VIA INTERMEDIATE PRODUCTS, THE RELATED APPARATUS AND A COMPOSITE STRUCTURE OBTAINABLE BY THE METHOD

This is a National Phase Application filed under 35 USC 371 of International Application No. PCT/DK2008/000297, filed on Aug. 22, 2008, an application claiming foreign priority benefits under 35 USC 119 of European Application No. 07388067.6, filed on Sep. 4, 2007, the content of each of which is hereby incorporated by reference in its entirety.

TECHNICAL FIELD

The present invention relates to a method of producing a composite structure comprising fibre reinforced material and having a longitudinal direction, composite structures and intermediate products obtainable by the method, and a mould apparatus for manufacturing the composite structure.

BACKGROUND

Wind turbine blades of fibre-reinforced polymer are usually manufactured as shell parts in moulds, where the top side and the bottom side of the blade profile (typically the pressure side and suction side, respectively) are manufactured separately by arranging glass fibre mats in each of the two mould parts. Afterwards, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The shell parts for the wind turbine blade are typically manufactured as fibre composite structures by means of VARTM (vacuum assisted resin transfer moulding), where liquid polymer, also called resin, is filled into a mould cavity, in which fibre material priorly has been inserted, and where a vacuum is generated in the mould cavity, hereby drawing in the polymer. The polymer can be thermoset plastic or thermoplastics.

Vacuum infusion or VARTM is a process used for moulding fibre composite mouldings, where uniformly distributed fibres are layered in one of the mould parts, the fibres being rovings, i.e. bundles of fibre bands, bands of rovings, or mats, which are either felt mats made of individual fibres or woven mats made of fibre rovings. The second mould part is often made of a resilient vacuum bag, and is subsequently placed on top of the fibre material. By generating a vacuum, typically 80% to 95% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases, the polymer applied is polyester or epoxy, and the fibre reinforcement is most often based on glass fibres or carbon fibres.

It is commonly known that moulds for making large articles, such as wind turbine blades, and consisting of two mould parts are closed about a longitudinal hinge line, where the hinges are passive, i.e. a crane is used to lift one of the mould parts about the hinge line for closure and opening of the mould. When making wind turbine blades, the mould is closed so as to glue two blade shell halves together, said shell halves being produced in separate mould parts.

Wind turbine blades have become increasingly longer over the years and blades of more than 60 meters are mass-produced, which means that mould assemblies for moulding such blades also have become increasingly larger. This results in problems in regard to the mould assemblies used, since the mould part rotating with respect to the other one during closure of the mould assembly reaches a very great height during the rotary motion, which may entail that the height of the ceiling in the halls where the blades are manufactured must be very great. This means that the halls become more expensive to build, or that the ceilings in existing halls have to be raised, which of course also results in higher financial costs. Furthermore, transport of these large composite structures is problematic.

Therefore, it has been proposed to separate wind turbine blades into two or more separate blade sections and then assemble the blades at the erection site of a wind turbine. Thereby, it is possible to manufacture the separate blade sections in smaller moulds and it is less problematic to transport the much smaller blade sections. An example of such a blade is described in WO 06/103307 and WO 2006/002621.

However, prior art blades divided into separate sections are joined via mechanical connection means, which introduces a mechanical interface which during use of the wind turbine blade can lead to local weaknesses and at worst cause a breakdown.

GB 2 162 791 discloses a method for exposing fibrous reinforcements of a fibre reinforced resin body by removing the resin at an end of the body. The hereby exposed fibres can be connected to a similarly treated resin body via a resin connection.

DE 103 52 964 discloses a method for repairing a fibre reinforced composite. The method involves removing matrix resin from fibre reinforced composites by subjecting a defined region to microwave radiation, after which the defined region is repaired with a repair resin and additional fibre material.

JP59174315 discloses a method of improving the strength a united section of fibre reinforced resin material by joining reinforcement fibres of two sections via use of a laser beam or a plasma heat source.

DISCLOSURE OF THE INVENTION

It is an object of the invention to obtain a new method of manufacturing assembled composite structures as well as to provide composite structures and intermediate products obtained by the method, and which overcomes or ameliorates at least one of the disadvantages of the prior art or which provides a useful alternative.

According to a first aspect of the invention, the object is obtained by a method that comprises the following steps: at a first site: a) manufacturing a first structure comprising a first cured composite part having a first thickness and a longitudinal direction with a first end, and a number of first fibre layers extending from the first end, at a second site: b) manufacturing a second structure comprising a second cured composite part having a second thickness and a longitudinal direction with a second end, and a number of second fibre layers extending from the second end, and at a third sit being remote from the first and the second site: c) arranging the first structure and the second structure so that the first end faces towards the second end, and arranging the first fibre layers and the second fibre layers so that at least a part of the first fibre layers overlap at least a part of the second fibre layers in the longitudinal direction, d) supplying liquid resin in order to impregnate the first fibre layers and the second fibre layers, and e) curing the liquid resin in order to form the composite structure comprising the first cured composite part, the second cured composite part, and an intermediate composite part including the first fibre layers and the second fibre layers.

Thus, it is possible to produce composite structures having a large longitudinal length by manufacturing separate smaller structures, each having a composite part and a number of non-cured fibre layers extending from the composite part, these fibre layers for instance hanging loosely from the composite part of the structure. These separate structures are subsequently moulded together by supplying and curing liquid resin to the non-cured fibre layers. This method for producing composite structure has a number of structural advantages over large composite structures comprising separate composite parts, which are mechanically connected, since the composite structure according to the invention does not have any boundary surfaces, which may give rise to structural weaknesses or weak points in the composite structure.

The cured composite part of the separate structure may be manufactured by any known moulding processes, such as VARTM, where a mould cavity is connected to a resin inlet and a vacuum outlet, the resin inlet and the vacuum outlet being used to impregnate material, such as a number of fibre layers and an optional core material, arranged in the mould cavity.

If the composite structure is manufactured via three or more separate structures, the intermediate structures of course need to have fibre layers extending from two ends of these structures. Furthermore, it is possible to manufacture the blade as a number of separate blade parts, which can be suitable for a number of different blade types or blade lengths.

The fibre layers may comprise rovings, i.e. bundles of fibre bands, bands of rovings, or mats, which may either be felt mats made of individual fibres or woven mats made of fibre rovings. The fibres can for instance be glass fibres, carbon fibres, plastic fibres, or plant fibres. The resin can for instance be epoxy, polyester, or vinylester. According to a particular advantageous embodiment, the fibre layers comprise glass fibres.

The composite structure may as mentioned be a wind turbine blade, in which case the first structure and the second structure are wind turbine blade parts.

According to a first advantageous embodiment, the first site is identical to or is in proximity of the second site. Thus, the first site and second site is preferably part of the same factory. By proximity is meant that the first site is located within 1000 meters, 500 meters, 300 meters, 200 meters, or 100 meters of the second site. By remote location is meant that the third site is positioned at least 100 meters, 200 meters, 300 meters, 500 meters, 1000 meters, or 5000 meters from the first site and the second site.

According to another advantageous embodiment, the third site is positioned within 1000 meters, 500 meters, 300 meters, 200 meters, or 100 meters from an erection site, e.g. the erection site of a wind turbine, where the wind turbine blades are to be used for the rotor of the wind turbine.

According to one embodiment, step a) involves the following steps: I) providing a forming structure comprising a mould cavity and having a longitudinal direction, II) placing fibre material in the mould cavity so that a part of the fibre material is arranged in a part corresponding to the first cured composite part of the first structure and another part of the fibre material forms the first fibre layers, III) providing a resin in the mould cavity simultaneously with and/or subsequently to step b) in the part corresponding to the first cured composite part of the first structure, and IV) curing the resin in order to form the first cured composite structure. Hereby, a particular simple method of manufacturing the first structure is provided, where only a part of the fibre layers are impregnated with resin and cured, whereas the remaining part of the fibre layers are not provided with resin and thus may hang loosely from the first cured composite part after curing. Advantageously, the fibre material is arranged so that the first fibre layers extend in the longitudinal direction beyond the mould cavity of the forming structure. Thus, the resin can be supplied to the mould cavity only, whereas the first fibre layers extend from the first end of the first cured composite part after curing.

The aforementioned embodiments of course also may apply to step b), i.e. the second structure may be manufactured according to the same method.

Thus according to a broader aspect, the invention also provides a method of manufacturing a composite structure having a longitudinal direction and comprising a first cured part having a first end from which a number of non-cured fibre layers extend, the method comprising the steps of: I) providing a forming structure comprising a mould cavity and having a longitudinal direction, II) placing fibre material in the mould cavity so that a part of the fibre material is arranged in a part corresponding to the first cured composite part of the first structure and another part of the fibre material forms the first fibre layers, III) providing a resin in the mould cavity simultaneously with and/or subsequently to step b) in the part corresponding to the first cured composite part of the first structure, and IV) curing the resin in order to form the first cured composite structure. As mentioned, the fibre material may be arranged so that the first fibre layers extend in the longitudinal direction beyond the mould cavity of the forming structure.

This method provides a simple alternative to the prior art methods of connecting composite structures, where resin has to be removed beforehand or where fibres has to be spliced by a laser beam or a plasma heat source. Furthermore, the method according to the invention provides for a stronger connection, since the fibre layers, e.g. comprising fibre bundles or rovings, renders a much higher fibre density possible in the connection.

According to a first embodiment, the first composite structure and the second composite structure are manufactured as shell members having an interior surface and an exterior surface. Typically, the composite structures are manufactured as shell members or shell half parts, which are subsequently glued together, for instance in order to manufacture a blade for a wind turbine. Therefore, the first structure and the second structure can also be shell parts for a given shell half composite structure. Thus, the shell halves can be assembled at the erection site and subsequently be glued together in order to construct a shell member having an interior surface and an exterior surface.

In another embodiment according to the invention, the method further comprises the steps of: i) providing a first mould part comprising a first sealing means for sealing against the interior surface of the first shell part, and a second sealing means for sealing against the interior surface of the second shell part, and ii) providing a second mould part comprising a first sealing means for sealing against the exterior surface of the first shell part, and a second sealing means for sealing against the exterior surface of the second shell part, and wherein steps d) and e) are carried out by use of the first mould part and the second mould part.

The mould parts can be vacuum bags or vacuum foils, and the sealing means can be any suitable material, such as tacky tape. Alternatively, one or both of the mould parts can be solid mould parts. According to a first embodiment, the first mould part and/or the second mould part is provided with a resin inlet. According to a second embodiment, the first mould part and/or the second mould part is provided with a vacuum outlet. Thereby, the mould parts can be used for impregnating the non-cured fibres with liquid resin via the VARTM method.

In yet another embodiment according to the invention, the first mould part and/or the second mould part comprises an inflatable part. Thereby, the given mould part can fit tightly to the interior surfaces and/or the exterior surfaces of the two structures. Typically, the first mould part will comprise an inflatable part and the second mould part be rigid.

However, the first fibre layers and second fibre layers can also be moulded by hand by applying resin to the fibre layers by for instance brush and roller, and subsequently allowing the resin to cure.

According to one embodiment, the first structure and the second structure are in step c) arranged so that surfaces of the first structure and the second structure substantially flush with each other. If the first structure and the second structure are shell members, this means that the interior surface of the first structure substantially flushes with the interior surface of the second structure, and that the exterior surface of the first structure substantially flushes with the exterior surface of the second structure.

According to another embodiment, the first end and/or the second end are angled so that the first thickness and/or the second thickness vary in the longitudinal direction. Thereby, the ends of the cured parts of the first and second composite structures may form a substantial v-shaped void, which ensures an efficient impregnation of the fibre layers extending from the two structures and which may substantially fill the v-shaped void.

According to yet another embodiment, the first fibre layers are cut so that ends thereof in step c) extend substantially to the second end and/or the second fibre layers are cut so that ends thereof extend substantially to the first end. This provides for embodiments, where the fibre layers extend maximally within the intermediate composite part, thus minimising the probability of local weaknesses or weak points of the finished composite structure.

In another embodiment according to the invention, the first fibre layers and/or the second fibre layers are cut in an angle so that the thickness of the respective layers vary in the longitudinal direction. The first fibre layers and/or the second fibre layers can also be cut so that ends thereof form a serrated boundary. Both of these embodiments provide intermediate structures having a great structural strength.

In another embodiment according to the invention, the first fibre layers are in step c) arranged such that a part of these defines one surface of the intermediate composite part, and the second fibre layers are arranged such that a part of these defines another surface of the intermediate composite part. The fibre layers can for instance define the interior part and the exterior part of the shell member, respectively.

According to an advantageous embodiment, the intermediate composite part forms a local thickening of the composite structure. This provides more strength to this part, thereby further reducing the probability of local weak points.

It is also possible to apply extra fibre layers to the different surfaces afterwards. Filling and grinding of the different surface may be necessary after the resin has cured. This applies both to the exterior surface of the composite structure and to the interior surface of the structure.

According to another aspect of the invention, the object is obtained by a composite structure obtainable by any of the afore-mentioned methods.

According to yet another aspect, the object is obtained by a blade shell part comprising a cured composite part comprising fibre reinforced polymer and having a first end from which a number of fibre layers extend. The blade shell part can also have a second end from which a number of fibre layers extend, in which case the blade shell part can be assembled with two other separate blade shell parts. As previously mentioned, the fibre layers may extend loosely from the ends of the cured composite part.

According to a last aspect of the invention, the object is also obtained by a blade mould apparatus comprising a first mould part and a second mould part as well as a resin inlet connected to a source of uncured resin and a vacuum outlet connected to a vacuum source, wherein the first mould part has a first sealing means for sealing against an interior surface of a first shell part, and a second sealing means for sealing against the an interior surface of the second shell part, and the second mould part has a first sealing means for sealing against the exterior surface of the first shell part, and a second sealing means for sealing against the exterior surface of the second shell part.

The first mould part, the first shell part, the second mould, part and the second shell part may thus form a mould cavity, and the resin inlet and vacuum outlet can be used to force uncured resin into this mould cavity in which the fibre layers of the first and second shell part are arranged.

As previously mentioned, the mould parts may be provided with a resin inlet and possibly a vacuum outlet. Further, the first mould part may comprise an inflatable part, which is so arranged as to sealingly push a part of the first mould part against the inner side of the blade shell part, when the inflatable part is inflated.

BRIEF DESCRIPTION OF THE DRAWINGS

The invention is explained in detail below with reference to the drawings, in which FIG. 1 shows mould parts with manufactured blade shell parts according to the invention, FIG. 2 shows a cross section of a first embodiment of an assembly between two blade shell parts according to the invention, FIG. 3 shows a cross section of a second embodiment of an assembly between two blade shell parts according to the invention, FIG. 4 shows a cross section of a third embodiment of an assembly between two blade shell parts according to the invention, FIG. 5 shows a cross section of a fourth embodiment of an assembly between two blade shell parts according to the invention, and FIG. 6 shows a cross section of a fifth embodiment of an assembly between two blade shell parts according to the invention, and FIG. 7 shows a cross section of a sixth embodiment of an assembly between two blade shell parts according to the invention.

DETAILED DESCRIPTION OF THE INVENTION

FIG. 1 shows a first mould part 100 with a first moulded structure in form of a first blade shell part 110 according to the invention, and a second mould part 150 with a second moulded structure in form of a second blade shell part 160 according to the invention. The blade shell parts 150, 160 are sectional shell parts of a pressure side of a wind turbine blade, where the first blade shell part 150 forms a part of the blade, which is closest to a hub and includes the root area when the blade is mounted to the hub of a wind turbine blade, and the second blade shell part 160 forms a part of the blade, which is furthest from the hub and includes the blade tip.

The first blade shell part 110 includes a first cured composite part 112, which has been moulded in a moulding surface of the first mould part 100. The first cured composite part 112 comprises a fibre-reinforced polymer material and can be manufactured by any conventional methods, such as the VARTM method. The first cured composite part 112 comprises a first end 113 from which a number of first fibre layers 114 extend. The first cured composite part 112 further comprises a flange 130, which is to be glued or otherwise adhered to flanges of a corresponding blade shell part, which is to define the suction side of the finished wind turbine blade.

The second blade shell part 160 includes a second cured composite part 162, which has been moulded in a moulding surface of the second mould part 150. The second cured composite part 162 comprises a fibre-reinforced polymer material and can be manufactured by any conventional methods, such as the VARTM method. The second cured composite part 162 comprises a second end 163 from which a number of second fibre layers 164 extend. The second cured composite part 162 further comprises a flange 180, which is to be glued or otherwise adhered to flanges of a corresponding blade shell part, which is to define the suction side of the finished wind turbine blade. The cured composite parts can comprise fibre layers, core material, and longitudinally extending reinforcement sections, which are known per se from conventional methods of manufacturing wind turbine blades of fibre-reinforced polymer.

The wind turbine blade can be assembled by arranging the two shell parts 110, 160 so that the first end 113 of the first blade shell part 110 faces the second end 163 of the second blade shell part 160. The fibre layers are subsequently impregnated with liquid resin and cured in order to form an intermediate composite part including the first fibre layers 114 and second fibre layers 164. The impregnation and curing can be carried out at the erection site of a wind turbine blade, and thus the blade shell parts can be transported to the site separately.

It may be necessary to apply additional fibre layers to the surfaces of the intermediate composite part. This can be carried out by hand. Additionally, it may be necessary to apply an appropriate finishing, such as filling and grinding of the different surfaces, in order to obtain a smooth surface.

The impregnation can be carried out by hand by use of brush and roller. Alternatively, known production methods, such as VARTM or RTM, can be used. The wind turbine blade can be assembled by first assembling the blade shell parts of the pressure side of the blade, assembling the blade shell parts of the suction side of the blade, and finally gluing the suction side and pressure side of the blade together. Alternatively, the blade shell parts 110, 160 of the pressure side of the finished blade may have been assembled with the corresponding blade shell parts of the suction side of the finished blade prior to being transported to the erection site. In this case, it may be necessary for workers to climb into the blade in order to install mould parts in the interior of the shell members and to carry out the necessary finishing of the blade.

The ends 113, 163 of the cured composite parts 112, 162 of the blade shell parts 110, 160 can be shaped in various ways to facilitate the assembly at the erection site and to ensure a great structural strength to the intermediate composite part of the finished composite structure. A number of embodiments of the ends and fibre layers are depicted in FIGS. 2-6.

FIG. 2 shows a cross section of a first blade shell part 210 and a second blade shell part 260 according to the invention. The first blade shell part 210 includes a first cured composite part 212 with a first end 213 from which a number of first fibre layers 214 extend. The first blade shell part 210 further comprises a first surface 216 and a second surface 218, which in a finished shell member may define the exterior surface and interior surface of the shell member, respectively. Correspondingly, the second blade shell part 260 includes a second cured composite part 262 with a second end 263 from which a number of second fibre layers 264 extend. The second blade shell part 260 further comprises a first surface 216 and a second surface 218, which in a finished shell member may define the exterior surface and interior surface of the shell member, respectively.

The first blade shell part 210 and the second blade shell part 260 are arranged so that the first fibre layers 214 and the second fibre layers 264 partially overlap in the longitudinal direction of the finished shell part. The first fibre layers 214 and second fibre layers 264 are subsequently impregnated with liquid resin and cured. The fibre layers 214, 264 may also partially consist of pre-impregnated fibre layers, in which case the fibre layers may be heated to a temperature in order to liquefy the resin and heated further to cure the resin. The impregnation and curing can be carried out by hand or carried out by known impregnation or infusion methods.

FIG. 2 further illustrates an embodiment for impregnating the fibre layers 214, 264 by use of the VARTM method. A second mould part 222 in form of a vacuum bag is sealed to the first surface 216 (or exterior surface) of the first blade shell part 210 and to the first surface 266 (or exterior surface) of the second blade shell part 260, for instance by use of tacky tape. Similarly, a first mould part 220 in form of a vacuum bag is sealed to the second surface 218 (or interior surface) of the first blade shell part 210 and to the second surface 266 (or interior surface) of the second blade shell part 260, for instance by use of tacky tape. If the blade parts are shell members with an interior or an exterior, the first mould part 220 may comprise an inflatable part in order to fill the interior of the shell member. The mould parts 220, 222 can also be rigid and have a forming surface, which is adapted to fit to the exterior of the shell part.

The fibre layers 214, 264 are impregnated by use of a resin inlet 224 and a vacuum outlet 226 in order to draw in liquid resin in the void formed between the first end 213 and the second end 263 and in which the fibre layers 214, 264 are arranged. In order to obtain an effective filling of the void, a distribution layer may be provided near the second surfaces 218, 268 of the shell parts 210, 260. Alternatively, the resin can be applied from resin inlets arranged at the first surfaces 216, 266 and vacuum outlets at the second surfaces 218, 268, or vice versa.

FIG. 3 shows a second embodiment of shell parts according to the invention, wherein like numerals correspond to like numerals of the first embodiment shown in FIG. 2. Therefore, only the difference between the two embodiments is described. The first fibre layers 314 are here arranged so that they are comprised in a lower half of the finished intermediate composite part and define a first surface of the intermediate composite part. The second fibre layers 364 are arranged so that they are comprised in an upper half of the finished intermediate composite part and define a second surface of the intermediate composite part.

FIG. 4 shows a third embodiment of shell parts according to the invention, wherein like numerals correspond to like numerals of the first embodiment shown in FIG. 2. Therefore, only the difference between the two embodiments is described. The first fibre layers 414 and the second fibre layers 464 are here cut in an angle so that the ratio between the amount of first fibres and second fibres gradually changes in the longitudinal direction of the finished composite structure. Thereby, it is for instance possible to gradually change the ratio between a first type of fibres, such as carbon fibres, and a second type of fibres, such as glass fibres.

FIG. 5 shows a fourth embodiment of shell parts according to the invention, wherein like numerals correspond to like numerals of the first embodiment shown in FIG. 2. Therefore, only the difference between the two embodiments is described. The first blade shell part 510 comprises a first pre-impregnated or pre-cured part 540, which defines a first surface of the intermediate composite structure, and the second blade shell part 560 comprises a second pre-impregnated or pre-cured part 590, which defines a second surface of the intermediate composite structure. The fibre layers 514, 564 are preferably impregnated by applying resin from one side and applying vacuum from the other side.

FIG. 6 shows a fifth embodiment of shell parts according to the invention, wherein like numerals correspond to like numerals of the first embodiment shown in FIG. 2. Therefore, only the difference between the two embodiments is described. The first end 613 of the first blade shell part 610 and the second end 663 of the second blade shell part 660 are here cut or formed with an angle so that the thicknesses of the first cured composite part 612 and the second cured composite part 662 vary in the longitudinal direction of the finished composite structure. This provides for an embodiment, where a v-shaped void is formed between the two ends 613, 663. Resin can be applied to the fibre layers 614, 664 filling the void from the first side of the structure, optionally with an upper distribution layer, to ensure the formation of a wide flow front of liquid resin moving towards the second side, where a vacuum is applied. This provides for an effective method of preventing the formation of dry spots in the fibre material.

FIG. 7 shows a sixth embodiment of shell parts according to the invention, wherein like numerals correspond to like numerals of the first embodiment shown in FIG. 2. Therefore, only the difference between the two embodiments is described. The figure depicts a cross section through a first blade shell part and a second shell part and shows both sides of the shell parts, e.g. the suction side and the pressure side of the finished blade. The first mould part 720 comprises an inflatable part 728 arranged so that the inflatable part, when inflated, presses part of the first mould part 720 sealingly against the interior surface 718 of the first blade shell part and the interior surface of the second blade shell part. The second mould part 722 is here depicted as a vacuum bag. However, the second mould part may be comprised of a number of rigid mould parts, which have a moulding surface defining an exterior part of the finished wind turbine blade.

The invention has been described with reference to a preferred embodiment. However, the scope of the invention is not limited to the illustrated embodiment, and alterations and modifications can be carried out without deviating from the scope of the invention.

LIST OF REFERENCE NUMERALS

In the numerals, x refers to a particular embodiment. Thus, for instance 410 refers to the first composite part of the fourth embodiment.

100 first mould part
x10 first composite structure/first blade shell part
x12 first cured composite part
x13 first end
x14 first fibre layers
x16 first surface/exterior surface
x18 second surface/interior surface
x20 first mould part
x22 second mould part
x24 resin inlet
x26 vacuum outlet
728 inflatable part
x30 blade shell flange
540 first pre-impregnated or pre-cured part
150 second mould part
x60 second composite structure/second blade shell part
x62 second cured composite part
x63 second end
x64 second fibre layers
x66 first surface/exterior surface
x68 second surface/interior surface
x80 blade shell flange
590 second pre-impregnated or pre-cured part

The invention claimed is:
1. A method of producing a wind turbine blade comprising fibre reinforced material and having a longitudinal direction, wherein the method comprises the following steps:
   a) manufacturing a first structure comprising a first cured composite part having a first thickness and a longitudinal direction with a first end, and a number of first uncured fibre layers extending from the first end of the first cured composite part,
   b) manufacturing a second structure comprising a second cured composite part having a second thickness and a longitudinal direction with a second end, and a number of second uncured fibre layers extending from the second end of the second cured composite part, and
   c) arranging the first structure and the second structure so that the first end faces towards the second end, and arranging the first uncured fibre layers and the second uncured fibre layers so that at least a part of the first uncured fibre layers overlap at least a part of the second uncured fibre layers in the longitudinal direction,
      i) providing a first mould part having a first sealing means for sealing against an interior surface of a first shell part of each of the first and second cured composite parts, and having a second sealing means for sealing against an interior surface of a second shell part of each of the first and second cured composite parts, and
      ii) providing a second mould part having a first sealing means for sealing against an exterior surface of a first shell part of each of the first and second cured composite parts, and having a second sealing means for sealing against an exterior surface of a second shell part of each of the first and second cured composite parts,
   d) supplying liquid resin in order to impregnate the first uncured fibre layers and the second uncured fibre layers,
   e) applying positive pressure by inflating at least one of the sealing means of each of the first and second mould parts against one of the interior and exterior surfaces of each of the first and second shell parts, and
   f) curing the liquid resin in order to form a composite structure comprising the first cured composite part, the second cured composite part, and an intermediate com- posite part including the now-cured first fibre layers and the now-cured second fibre layers.

2. A method according to claim 1, wherein step a) involves the following steps:
   I) providing a forming structure comprising a mould cavity and having a longitudinal direction,
   II) placing fibre material in the mould cavity so that a part of the fibre material is arranged in a part corresponding to the first cured composite part of the first structure and another part of the fibre material forms the first uncured fibre layers,
   III) providing a resin in the mould cavity simultaneously with and/or subsequently to said placing the fibre material in the mould cavity in the part corresponding to the first cured composite part of the first structure, and
   IV) curing the resin in order to form the first cured composite structure.

3. A method according to claim 2, wherein the fibre material is arranged so that the first uncured fibre layers extend in the longitudinal direction beyond the mould cavity of the forming structure.

4. A method according to claim 1, wherein the first cured composite structure and the second cured composite structure are manufactured as shell members having an interior surface and an exterior surface.

5. A method according to claim 1, wherein the first mould part and/or the second mould part are provided with a resin inlet.

6. A method according to claim 5, wherein the first mould part and/or the second mould part are provided with a vacuum outlet.

7. A method according to claim 1, wherein the first mould part and/or the second mould part comprise an inflatable part.

8. A method according to claim 1, wherein the first structure and the second structure in step c) are arranged so that surfaces of the first structure and the second structure substantially flush with each other.

9. A method according to claim 1, wherein the first end and/or the second end are angled so that the first thickness and/or the second thickness vary in the longitudinal direction.

10. A method according to claim 1, wherein the first uncured fibre layers are cut so that ends thereof in step c) extend substantially to the second end and/or the second uncured fibre layers are cut so that ends thereof extend substantially to the first end.

11. A method according to claim 1, wherein the first uncured fibre layers and/or the second uncured fibre layers are cut in an angle so that the thickness of the respective layers vary in the longitudinal direction.

12. A method according to claim 1, wherein the first uncured fibre layers and/or the second uncured fibre layers are cut so that ends thereof form a serrated boundary.

13. A method according to claim 1, wherein the first uncured fibre layers in step c) are arranged such that a part of these defines one surface of the intermediate composite part, and the second uncured fibre layers are arranged such that a part of these defines another surface of the intermediate composite part.

14. A method according to claim 1, wherein the intermediate composite part forms a local thickening of the composite structure.

* * * * *